(12) United States Patent
Masuda (10) Patent No.: US 9,076,595 B2
(45) Date of Patent: Jul. 7, 2015

(54) CAPACITOR

(71) Applicant: Taiyo Yuden Co., Ltd., Tokyo (JP)

(72) Inventor: Hidetoshi Masuda, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 77 days.

(21) Appl. No.: 14/013,341

(22) Filed: Aug. 29, 2013

(65) Prior Publication Data

US 2014/0063690 A1 Mar. 6, 2014

(30) Foreign Application Priority Data

Aug. 31, 2012 (JP) .................. 2012-191162

(51) Int. Cl.
*H01G 4/005* (2006.01)
*H01G 4/10* (2006.01)

(52) U.S. Cl.
CPC ....................... *H01G 4/10* (2013.01)

(58) Field of Classification Search
USPC ............... 361/303, 301.2, 301.4, 305, 306.1, 361/306.3, 311–313, 321.1–321.2
See application file for complete search history.

(56) References Cited

U.S. PATENT DOCUMENTS

| | | | | |
|---|---|---|---|---|
| 6,072,690 | A * | 6/2000 | Farooq et al. | 361/321.2 |
| 6,407,907 | B1 * | 6/2002 | Ahiko et al. | 361/306.3 |
| 7,965,492 | B2 * | 6/2011 | Oh | 361/303 |
| 8,023,249 | B2 | 9/2011 | Masuda et al. | |
| 8,027,145 | B2 * | 9/2011 | Yawata et al. | 361/303 |
| 8,134,826 | B2 * | 3/2012 | Masuda et al. | 361/312 |
| 8,531,816 | B2 * | 9/2013 | Take et al. | 361/311 |
| 2005/0207093 | A1 * | 9/2005 | Togashi et al. | 361/321.2 |
| 2009/0086404 | A1 | 4/2009 | Masuda et al. | |
| 2009/0195963 | A1 | 8/2009 | Masuda et al. | |

FOREIGN PATENT DOCUMENTS

| | | |
|---|---|---|
| JP | 2003-011099 A | 1/2003 |
| JP | 2009-076850 A | 4/2009 |
| JP | 2009-088034 A | 4/2009 |
| JP | 4493686 B2 | 4/2010 |

OTHER PUBLICATIONS

Office Action dated Jan. 23, 2015 in Korean Application No. 10-2013-0091889, filed Aug. 2, 2013.

* cited by examiner

*Primary Examiner* — Nguyen T Ha
(74) *Attorney, Agent, or Firm* — Saliwanchik, Lloyd & Eisenschenk (57) ABSTRACT

A capacitor includes a dielectric layer having a first plane, a second plane opposite to the first plane, and first and second through-holes communicated with the first plane and the second plane; a first external conductor layer disposed on the first plane; a second external conductor layer disposed on the second plane; a first internal electrode formed in the first through-hole, connected to the first external electrode layer, disposed in the second hole diameter part at a tip and separated from the second external electrode layer; and a second internal electrode formed in the second through-hole, connected to the second external electrode layer, and separated from the first external electrode layer.

5 Claims, 12 Drawing Sheets

CAPACITOR

CROSS-REFERENCE TO RELATED APPLICATION

This application claims priority under 35 U.S.C. §119 to Japanese Patent Application No. JP 2012-191162 filed on Aug. 31, 2012, the entire content of which is hereby incorporated herein by reference in its entirety.

FIELD

The present disclosure relates to a porous capacitor.

BACKGROUND

In recent years, as a new type capacitor, a porous capacitor has been developed. The porous capacitor takes advantages of a tendency that a metal oxide formed on a surface of a metal such as aluminum forms a porous structure. The porous capacitor is configured by forming internal electrodes in pores and using the metal oxide as a dielectric.

Conductors are laminated on front and back surfaces of the dielectric. The electrodes formed in the pores are connected to either of the conductors on the front surface or the conductors on the back surface. The conductors not connected to the internal electrodes are insulated by a void or an insulating material. In this way, the electrodes formed in the pores function as counter electrodes facing each other via the dielectric.

For example, Japanese Patent No. 4493686 and Japanese Patent Application Laid-open No. 2009-76850 each disclose a porous capacitor having such a configuration. In Japanese Patent No. 4493686 and Japanese Patent Application Laid-open No. 2009-76850, the internal electrodes are formed in the porous, one end of the internal electrodes is connected to one of the conductors, and the other end is insulated from the other conductor.

SUMMARY

In the porous capacitor having the above-described configuration, insulation breakdown withstand voltage of the capacitor is influenced by insulation properties between the internal electrodes faced each other. As described above, the internal electrodes are formed in the pores of the dielectric layer. When the dielectric layer that separates the internal electrodes become thick, it is possible to improve the insulation breakdown withstand voltage of the capacitor. However, when the dielectric layer that separates the internal electrodes become thick, a facing distance of the internal electrodes is increased and the capacity of the capacitor is decreased. In other words, it is difficult in the porous capacitor to improve the insulation breakdown withstand voltage as well as to maintain the capacity.

In view of the circumstances as described above, an object of the present disclosure is to provide a porous capacitor where the insulation breakdown withstand voltage can be improved and the capacity can be maintained.

In order to achieve the object, a capacitor according to an embodiment of the present disclosure includes a dielectric layer, a first external electrode layer, a second external electrode layer, a first internal electrode and a second internal electrode.

The dielectric layer has a first plane, a second plane opposite to the first plane, and a plurality of through-holes communicated with the first plane and the second plane; the plurality of through-holes including a first through-hole and a second through-hole, the first through-hole including a first hole diameter part having a first hole diameter and a second hole diameter part having a second hole diameter smaller than the first hole diameter at a second plane side.

The first external conductor layer is disposed on the first plane.

The second external conductor layer is disposed on the second plane.

The first internal electrode is formed in the first through-hole, connected to the first external electrode layer, disposed in the second hole diameter part at a tip and separated from the second external electrode layer.

The second internal electrode is formed in the second through-hole, connected to the second external electrode layer, and separated from the first external electrode layer.

DETAILED DESCRIPTION OF EMBODIMENTS

A capacitor according to an embodiment of the present disclosure includes a dielectric layer, a first external electrode layer, a second external electrode layer, a first internal electrode and a second internal electrode.

The dielectric layer has a first plane, a second plane opposite to the first plane, and a plurality of through-holes communicated with the first plane and the second plane; the plurality of through-holes including a first through-hole and a second through-hole, the first through-hole including a first hole diameter part having a first hole diameter and a second hole diameter part having a second hole diameter smaller than the first hole diameter at a second plane side.

The first external conductor layer is disposed on the first plane.

The second external conductor layer is disposed on the second plane.

The first internal electrode is formed in the first through-hole, connected to the first external electrode layer, disposed in the second hole diameter part at a tip and separated from the second external electrode layer.

The second internal electrode is formed in the second through-hole, connected to the second external electrode layer, and separated from the first external electrode layer.

When a voltage is applied to the porous capacitor, an electric field is concentrated on tips of the internal electrodes. Started from the tips of the internal electrodes, the insulation withstand voltage is broken between the internal electrodes faced each other. By the above-described configuration, the first through-hole has the smaller second hole diameter part, and the tip of the first internal electrode is disposed in the second hole diameter part. Therefore, the dielectric layer becomes thicker against the internal electrodes faced each other, thereby improving insulation properties. On the other hand, the first through-hole has a larger diameter at a first plane side. Therefore, a distance between the second internal electrode facing to the first internal electrode is short and the capacity of the capacitor is not so decreased. Thus, the capacitor according to the embodiment is configured to achieve the improvement of the insulation breakdown withstand voltage and the maintenance of the capacity of the capacitor at the same time.

The second through-hole may include a third hole diameter part having a third hole diameter and a fourth hole diameter part having a fourth hole diameter smaller than the third hole diameter at the first plane side.

The second internal electrode may be disposed in the fourth hole diameter part at a tip.

By the configuration, the second through-hole has a non-uniform hole diameter similar to the first through-hole, and the hole diameter at the second plane side is larger than that at the first plane side, thereby achieving the improvement of the insulation breakdown withstand voltage and the maintenance of the capacity of the capacitor at the same time. The second internal electrode formed in the second through-hole is connected to the second external electrode layer, and is separated from the first external electrode layer, and a magnitude relationship between the hole diameters in the second through-hole is opposite to that of the first through-hole.

The first through-hole may include a fifth hole diameter part having a fifth hole diameter smaller than the first hole diameter and larger than the second hole diameter between the first hole diameter part and the second hole diameter part.

The second through-hole may include a sixth hole diameter part having a sixth hole diameter smaller than the third hole diameter and larger than the fourth hole diameter between the third hole diameter part and the fourth hole diameter part.

As described above, the first through-hole having a smaller diameter is formed at a second external electrode layer side where the first internal electrode formed therein is insulated, thereby improving insulation properties. However, a site to induce the insulation breakdown is transferred from around the tip of the first internal electrode to a leveled corner (a difference in level in the hole diameter). As a result, the insulation properties may not be sufficiently improved. By forming the fifth hole diameter part having an intermediate diameter (a fifth hole diameter) between the first hole diameter part and the second hole diameter part in the first through-hole, electric field concentration at the leveled corner is dispersed, and the insulation breakdown started from the leveled corner can be prevented. In this way, the insulation breakdown withstand voltage between the internal electrodes are further improved. Similar to the second through-hole, by forming the sixth hole diameter part having the sixth hole diameter, the insulation breakdown started from the leveled corner of the second internal electrode can be prevented. In this way, the insulation breakdown withstand voltage between the internal electrodes are further improved while the capacity of the capacitor is maintained. In addition, the first through-hole and the second through-hole may have multistage hole diameter parts. Depending on a balance between the required capacity of the capacitor and the insulation breakdown withstand voltage, the number of the stages may be determined.

The dielectric layer may be made of a material that provides the through-holes by anodic oxidation.

By this configuration, the pores (the porous through-holes) formed by the anodic oxidation, i.e., formed by the self-organizing action of the material, can be used as the first through-holes and the second through-holes.

The dielectric layer may be made of aluminum oxide.

When aluminum oxide ($Al_2O_3$) is anodic oxidized, the pores are provided by its self-organizing action. In addition, aluminum oxide is a dielectric material. Therefore, aluminum oxide is suitable for the material of the dielectric layer.

Hereinafter, embodiments of the present disclosure will be described with reference to the drawings.

(Capacitor Configuration)

Figure 1:
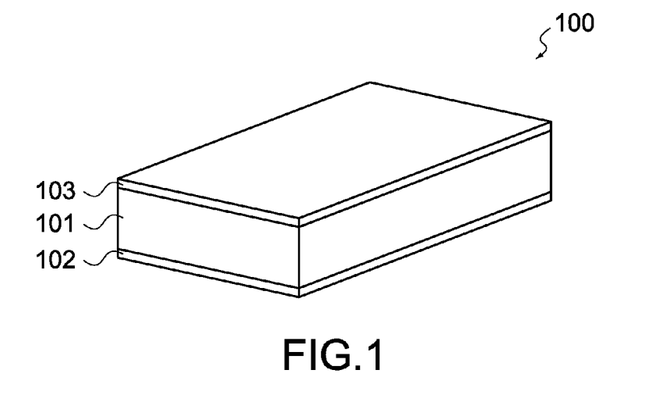
FIG. 1 is a perspective view of a capacitor according to an embodiment of the present disclosure.
Figure 2:
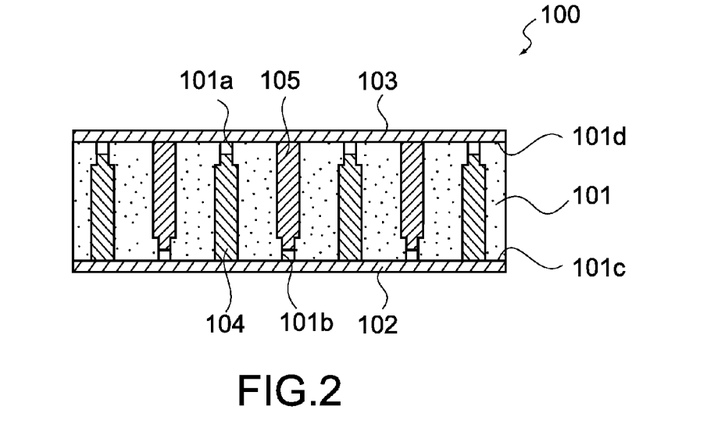
FIG. 2 is a cross-sectional view of the capacitor.

FIG. 1 is a perspective view showing a capacitor 100 according to an embodiment of the present disclosure. FIG. 2 is a sectional view of the capacitor 100. As shown in these drawings, the capacitor 100 has a dielectric layer 101, a first external electrode layer 102, a second external electrode layer 103, first internal electrodes 104 and second internal electrodes 105.

The first external electrode layer 102, the dielectric layer 101 and the second external electrode layer 103 are laminated in this order. In other words, the dielectric layer 101 is sandwiched between the first external electrode layer 102 and the second external electrode layer 103. The first internal electrodes 104 and the second internal electrodes 105 are formed within through-holes formed in the dielectric layer 101, as shown in FIG. 2. Also, the capacitor 100 may have configurations other than those shown here, and wirings connected to the first external electrode layer 102 or the second external electrode layer 103 may be formed on the capacitor 100.

The dielectric layer 101 functions as a dielectric of the capacitor 100. The dielectric layer 101 can be made of a dielectric material capable of forming through-holes (pores) as described layer, in particular, a material that can provide pores by the self-organizing action when it is anodic oxidized. Examples include aluminum oxide ($Al_2O_3$). Also, the dielectric layer 101 may be made of an oxide of a bulb metal (Al, Ta, Nb, Ti, Zr, Hf, Zn, W, Sb). The thickness of the dielectric layer 101 is not particularly limited. For example, the dielectric layer 101 has a thickness of several μms to hundreds μms.

Figure 3:
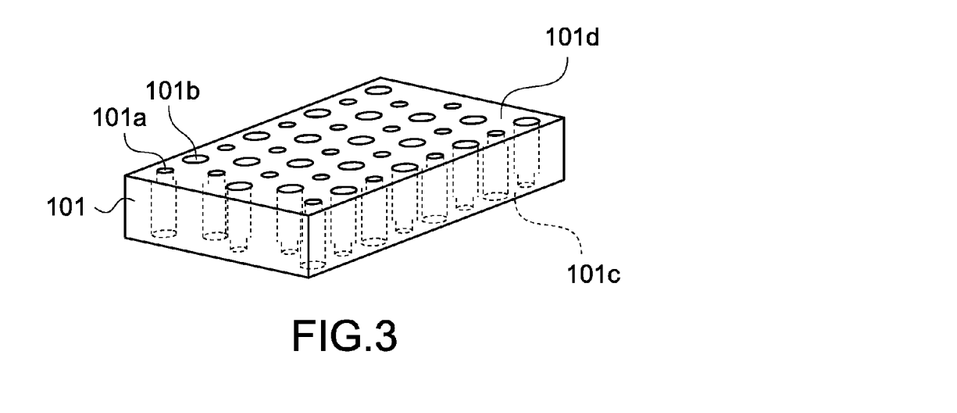
FIG. 3 is a perspective view showing a dielectric layer of the capacitor.

FIG. 3 is a perspective view showing the dielectric layer 101. As shown in FIG. 3, a plurality of first through-holes 101a and second through-holes 101b are formed in the dielectric layer 101. A plane in parallel with a laminar direction of the dielectric layer 101 is defined as a first plane 101c, and an opposite plane thereof is defined as a second plane 101d. Respective first through-holes 101a and second through-holes 101b are formed in a direction perpendicular to the first plane 101c and the second plane 101d (in a thickness direction of the dielectric layer 101), and are communicated with the first plane 101c and the second plane 101d. The number and the size of the first through-holes 101a and the second through-holes 101b shown in FIG. 3 etc. are illustrative. In practice, the first through-holes 101a and the second through-holes 101b may be smaller and more numerous.

Figure 4:
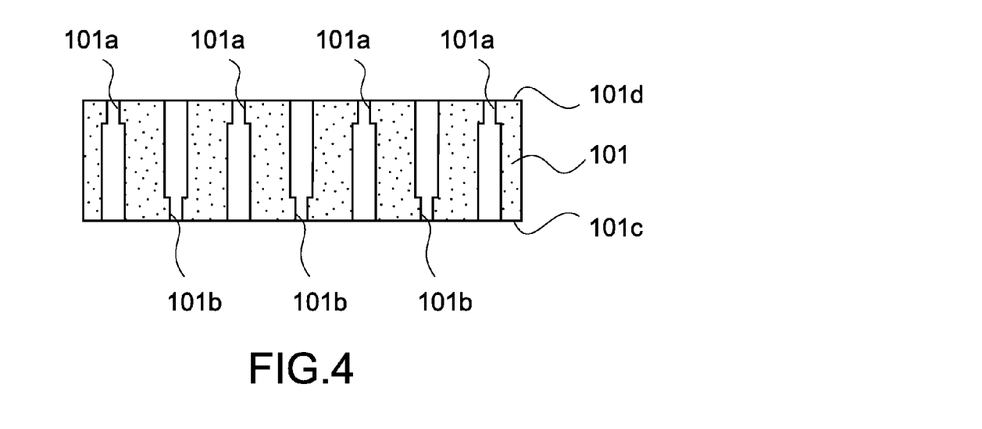
FIG. 4 is a cross-sectional view showing the dielectric layer of the capacitor.
Figure 5:
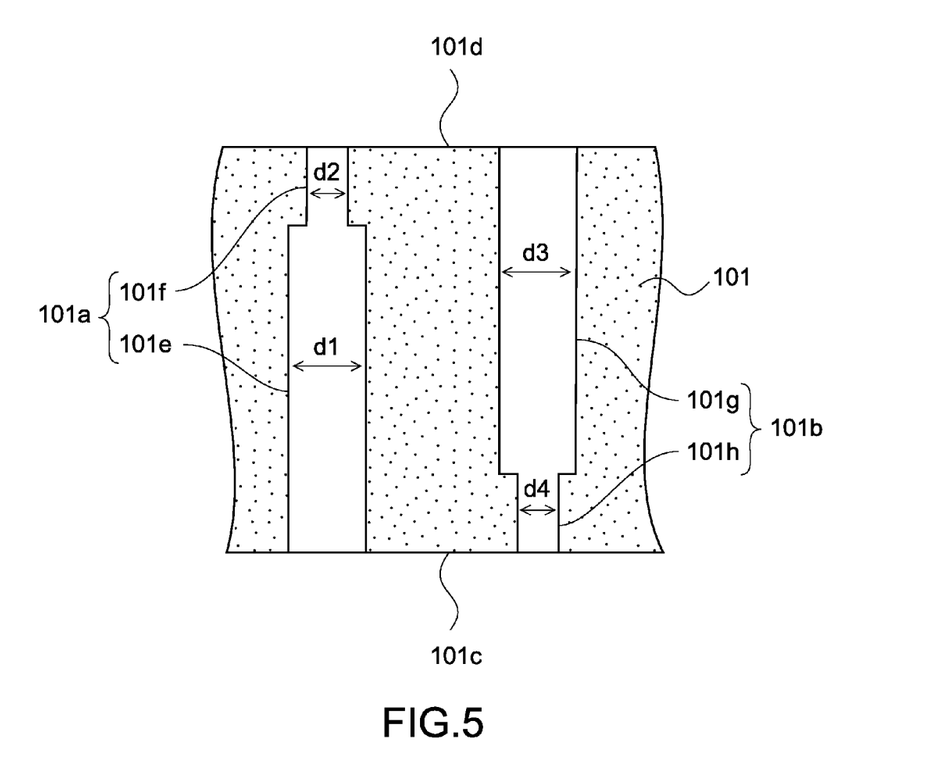
FIG. 5 is a an enlarged sectional view showing the dielectric layer of the capacitor.

FIG. 4 is a cross-sectional view showing the dielectric layer 101. FIG. 5 is an enlarged sectional view of FIG. 4. As shown in FIGS. 4 and 5, the first through-holes 101a are configured of two parts having different hole diameters. In other words, there are a first hole diameter part 101e having a hole diameter d1 and a second hole diameter part 101f having a hole diameter d2. The hole diameter d2 is smaller than the hole diameter d1. In the first through-holes 101a, the first hole diameter part 101e is formed at a first plane 101c side, and the second hole diameter part 101f is formed at a second plane 101d side. A percentage (length ratio) of the first hole diameter part 101e and the second hole diameter part 101f is not especially limited. However, the first hole diameter part 101e preferably occupies a large part, as shown in FIG. 5.

Also as shown in FIGS. 4 and 5, the second through-holes 101b are configured of two parts having different hole diameters. In other words, there are a third hole diameter part 101g having a hole diameter d3 and a fourth hole diameter part 101h having a hole diameter d4. The hole diameter d4 is smaller than the hole diameter d3. In the second through-hole 101b, the third hole diameter part 101g is formed at a second plane 101d side, and the fourth hole diameter part 101h is formed at a first plane 101c side. A percentage (length ratio) of the third hole diameter part 101g and the fourth hole diameter part 101h is not especially limited. However, the third hole diameter part 101g preferably occupies a large part, as shown in FIG. 5.

As to a relationship between respective hole diameters d1 to d4, the hole diameter d1 may be larger than the hole diameter d2, and the hole diameter d3 may be larger than the hole diameter d4, as described above. The hole diameter d1 and the hole diameter d3 may be same or different. Similarly, the hole diameter d2 and the hole diameter d4 may be same or different. According to a method of forming the dielectric layer 101 as described later, the hole diameter d1 and the hole diameter d3, and the hole diameter d2 and the hole diameter 4d may be similar.

The shape (cross-sectional shape) of each of the first through-holes 101a and the second through-holes 101b is not particularly limited so long as a magnitude relationship among the above-described hole diameters d1 to d4 is satisfied. It may be a circle, an oval, or an irregular shape. The size of the hole diameters d1 to d4 may be several tens nm to hundreds nms Also, the space of the first through-holes 101a and second through-holes 101b adjacent may be several tens nm to hundreds nms.

As shown in FIG. 2, the first internal electrodes 104 are formed in the first through-holes 101a, and the second internal electrodes 105 are formed in the second through-holes 101b, respectively. Thus, an arrangement of the first through-holes 101a and the second through-holes 101b equals to an arrangement of the first internal electrodes 104 and the second internal electrodes 105. Although FIG. 4 shows that the first through-holes 101a and the second through-holes 101b are arranged alternately. They may be arranged randomly. A numerical percentage of the first through-holes 101a and the second through-holes 101b is not particularly limited. However, it is desirable that the percentage of the first internal electrodes 104 and the second internal electrodes 105 is similar, as the capacitor 100 can have high capacity.

As shown in FIG. 2, the first external electrode layer 102 is disposed at the first plane 101c of the dielectric layer 101. The first external electrode layer 102 may be made of a conductive material, e.g., a pure metal such as Cu, Ni, Cr, Ag, Pd, Fe, Sn, Pb, Pt, Ir, Rh, Ru, Al and Ti or an alloy thereof. The thickness of the first external electrode layer 102 may be several tens nm to several µms. The first external electrode layer 102 may be disposed such that a plurality of conductive material layers is laminated.

As shown in FIG. 2, the second external electrode layer 103 is disposed at the second plane 101d of the dielectric layer 101. The second external electrode layer 103 may be made of the conductive material used in the first external electrode layer 102. The thickness of thereof may be several nm to several µms. The constituent material of the second external electrode layer 103 may be the same or different as/from the constituent material of the first external electrode layer 102. Also, the second external electrode layer 103 may be disposed such that a plurality of conductive material layers is laminated.

Figure 6:
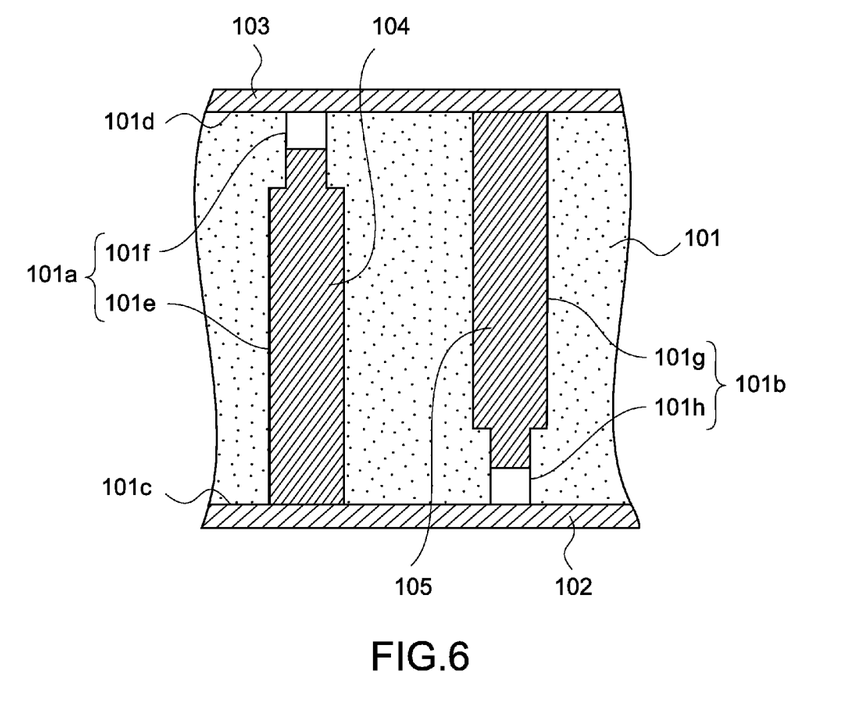
FIG. 6 is an enlarged sectional view of the capacitor.

The first internal electrodes 104 function as one of counter electrodes of the capacitor 100. As shown in FIG. 2, the first internal electrodes 104 are formed such that they are housed in the first through-holes 101a, and are connected to the first external electrode layer 102. FIG. 6 is an enlarged sectional view showing shapes of the first internal electrode 104 and the second internal electrode 105. As shown in FIG. 6, the first internal electrode 104 has a two-staged diameter (electrode diameter) corresponding to the shape (two-staged hole diameter) of the first through-hole 101a, and is formed from the first external electrode layer 102 to the second hole diameter part 101f partway via the first through-hole part 101e of the first through-hole 101a. In other words, one end of the first internal electrode 104 is connected to the first external electrode layer 102, and the other end, i.e., a tip, of the first internal electrode 104 is disposed in the second hole diameter part 101f and is separated from the second external electrode layer 103. A space may be provided between the first internal electrode 104 and the second external electrode layer 103, and an insulator may also be provided therebetween.

The first internal electrodes 104 may be made of a conductive material, e.g., a pure metal such as Cu, Ni, Co, Cr, Ag, Au, Pd, Fe, Sn, Pb and Pt or an alloy thereof.

The second internal electrodes 105 function as one of counter electrodes of the capacitor 100. As shown in FIG. 2, the second internal electrodes 105 are formed such that they are housed in the second through-holes 101b, and are connected to the second external electrode layer 103. As shown in FIG. 6, the second internal electrode 105 has a two-staged diameter (electrode diameter) corresponding to the shape (two-staged hole diameter) of the second through-hole 101b, and is formed from the second external electrode layer 103 to the fourth hole diameter part 101h partway via the third through-hole part 101g of the second through-hole 101b. In other words, one end of the second internal electrode 105 is connected to the second external electrode layer 103, and the other end, i.e., a tip, of the second internal electrode 105 is disposed in the fourth hole diameter part 101h and is separated from the first external electrode layer 102. A space may be provided between the second internal electrode 105 and the first external electrode layer 102, and an insulator may also be provided therebetween.

The second internal electrodes 105 may be made of a conductive material, e.g., a pure metal such as Cu, Ni, Co, Cr, Ag, Au, Pd, Fe, Sn, Pb and Pt or an alloy thereof similar to the first internal electrodes 104. The material of the second external electrode 105 may be the same or different as/from the material of the first internal electrode 104.

(Effects of Capacitor)

The capacitor 100 has the above-described configuration. As shown in FIG. 2, the first internal electrodes 104 and the second internal electrodes 105 are faced each other via the dielectric layer 101, thereby providing the capacitor. The first internal electrodes 104 are conducted to the first external electrode layer 102, and are connected externally via the first internal electrode layer 102. The second internal electrodes 105 are conducted to the second external electrode layer 103, and are connected externally via the second internal electrode layer 103.

As described above, the first internal electrodes 104 are insulated from the second external electrodes 103, but the electric field is concentrated on tips of the first internal electrodes 104. As a result, insulation properties between the first internal electrodes 104 and the second internal electrodes 105 are influenced by a thickness (a wall thickness) of the dielectric layer 101 surrounding the tips of the first internal electrodes 104. Since the space (or the insulator) is provided between the first internal electrodes 104 and the second external electrode layer 103, sufficient insulation properties can be easily ensured. Here, according to the embodiment, the tips of the first internal electrodes 104 are formed within the second hole diameter part 101f (see FIG. 6) and surrounded by the walls of the thick dielectric layer 101, thereby improving the insulation properties between the first internal electrodes 104 and the second internal electrode 105.

On the other hand, most parts of the first internal electrodes 104 are formed within the first hole diameter part 101e. In general, the capacitor has larger capacity when a distance between the counter electrodes separated by the dielectric is shorter. Since the most parts of the first internal electrodes 104 are here separated from the second internal electrodes 105 facing to the first internal electrodes 104, the capacity of the capacitor 100 is maintained.

If each of the hole diameter d1 of the first hole diameter part 101e is same as each of the hole diameter d2 of the second hole diameter part 101f, in other words, the first through-holes 101a have a single hole diameter, the distance between the counter electrodes becomes longer, which will increase the insulation properties, but will decrease the capacity of the capacitor, instead. In contrast, in the dielectric layer 101 according to the embodiment, as the distance between the counter electrodes becomes long only around the tips of the electrodes, the capacity of the capacitor will not be less decreased.

In this way, the second hole diameter part 101f and the first hole diameter part 101e are formed in the first through-hole 101a according to the embodiment. It is thus possible to improve the insulation properties between the first internal electrodes 104 and the second internal electrodes 105 as well as to maintain the capacity of the capacitor 100.

The same is applied to the second internal electrodes 105. The second internal electrodes 105 are insulated from the first external electrodes 104, but the electric field is concentrated on tips of the second internal electrodes 104. As a result, insulation properties between the second internal electrodes 105 and the first internal electrodes 104 are influenced by a thickness (a wall thickness) of the dielectric layer 101 surrounding the tips of the second internal electrodes 105. Here, according to the embodiment, the tips of the second internal electrodes 105 are formed within the fourth hole diameter part 101h (see FIG. 6) and surrounded by the walls of the thick dielectric layer 101, thereby improving the insulation properties between the second internal electrodes 105 and the first internal electrode 104.

On the other hand, most parts of the second internal electrodes 104 are formed within the third hole diameter part 101g. Since the most parts of the second internal electrodes 105 are separated from the first internal electrodes 104 facing to the second internal electrodes 105, the capacity of the capacitor 100 is maintained. In this way, the fourth hole diameter part 101h and the third hole diameter part 101g are formed in the second through-holes 101b according to the embodiment. It is thus possible to improve the insulation properties between the second internal electrodes 105 and the first internal electrodes 104 as well as to maintain the capacity of the capacitor 100.

As described above, the first through-holes 101a and the second through-holes 101b each having a two-staged diameter are formed in the capacitor 100 according to the embodiment. It is thus possible to maintain the capacity of the capacitor as well as to improve insulation breakdown withstand voltage. Specifically, the capacitor (having the through-holes with a uniform hole diameter) having no configuration of the embodiment had the insulation breakdown withstand voltage of 10 to 15V. In contrast, the experiment reveals that the capacitor (having a large hole diameter part with the same hole diameter) having the configuration of the embodiment had improved insulation breakdown withstand voltage of 20 to 25V. In addition, a capacity value of the capacitor according to the embodiment was decreased only by 2.3%. The result data was an average value, N=50.

[Method of Forming Capacitor]

A method of forming the capacitor 100 described above will be described. The formation method as described below is only illustrative, and the capacitor 100 may be formed by a formation method different from the formation method as described below. FIGS. 7 to 12 are schematic views showing a method of forming the capacitor 100.

Figure 7A:
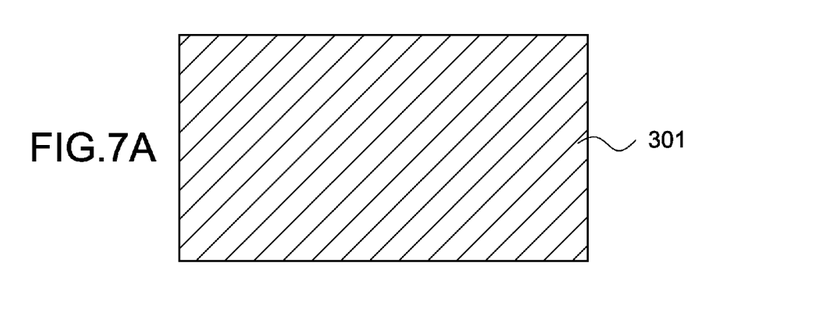
FIGS. 7A, 7B and 7C are each a schematic diagram showing a formation process of the capacitor.

FIG. 7A shows a substrate 301 that will be the dielectric layer 101. When the dielectric layer 101 is made of a metal oxide (for example, aluminum oxide), the substrate 301 is made of a metal before oxidation (for example, aluminum).

Figure 7B:
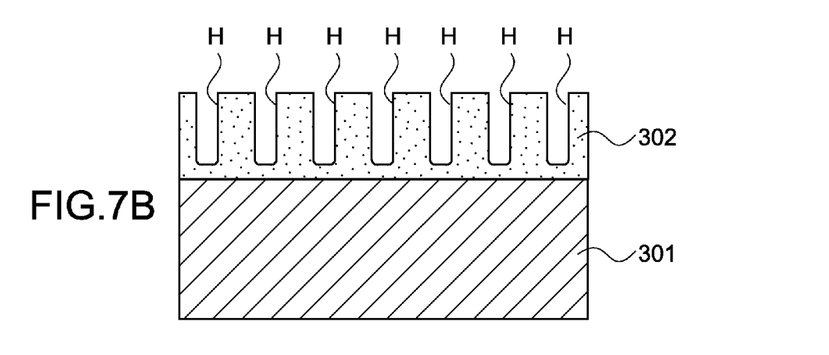

As shown in FIG. 7B, when a voltage is applied to the substrate 301 as an anode in an oxalic acid (0.1 mol/l) solution controlled at a temperature of 15 to 20° C., for example, the substrate 301 is oxidized (anodic oxidized) to form a substrate oxide 302. In this case, by the self-organizing action of the substrate oxide 302, holes H are formed in the substrate oxide 302. The holes H are grown in a direction of oxidation processes, i.e., in a thickness direction of the substrate 301. The hole diameters of the holes H correspond to the above-described hole diameters d1 and the hole diameters d3 (see FIG. 5).

Before the anodic oxidation, regular pits (concave portions) are formed in the substrate 301, the holes H may be grown based on the pits. In this manner, the pit placement can control the arrangement of the through-holes (the first through-holes 101a and the second through-holes 101b). The pits may be formed by pressing the substrate 301 with a mold, for example.

Figure 7C:
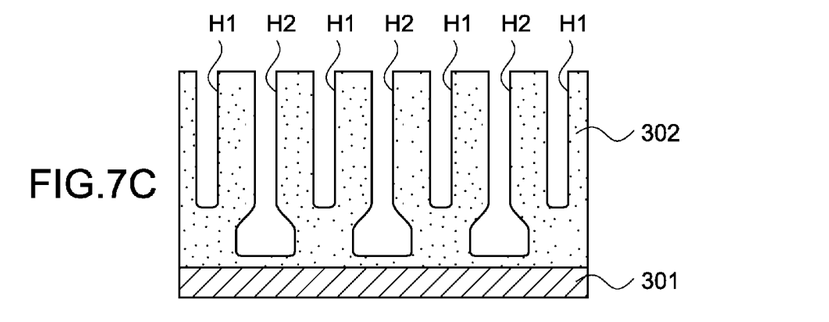

As the predetermined time is elapsed, the voltage applied to the substrate 301 is increased. Pitches between the holes H formed by the self-organizing action are determined depending on the magnitude of the applied voltage. The self-organizing action proceeds so that the pitches of the holes H are enlarged. In this way, some holes H continue to be formed and enlarged, as shown in FIG. 7C. On the other hand, the formation of some holes H stops due to the enlarged pitches of the holes H. Hereinafter, the holes H where the formation stops are referred to as holes H1, and the holes H where the formation continues (the holes are enlarged) are referred to as holes H2.

The conditions of the anodic oxidation can be set arbitrarily. For example, at a first stage of the anodic oxidation shown in FIG. 7B, the applied voltage can be set to several V to hundreds V and the processing time can be set to several minutes to several days. The voltage value can be set to several times greater than that in the first stage and the processing time can be set to several minutes to several days at a second stage of the anodic oxidation shown in FIG. 7C.

For example, when the applied voltage at the first stage is set to 40V, the holes H each having a hole diameter of 100 nm are formed, and when the applied voltage at the second stage is set to 80V, the holes H2 each has an enlarged hole diameter of 200 nm. By limiting the voltage at the second stage to the above-described range, the numbers of the holes H1 and the holes H2 can be almost the same. By limiting the time for applying the voltage at the second stage within the above-described range, the substrate oxide 302 formed by applying the voltage at the second stage can be thin, while a pitch enlargement of the holes H2 is fully achieved. Since the substrate oxide 302 formed by applying the voltage at the second stage is removed at a later step, it is desirable that the substrate oxide 302 is as thin as possible.

Figure 8A:
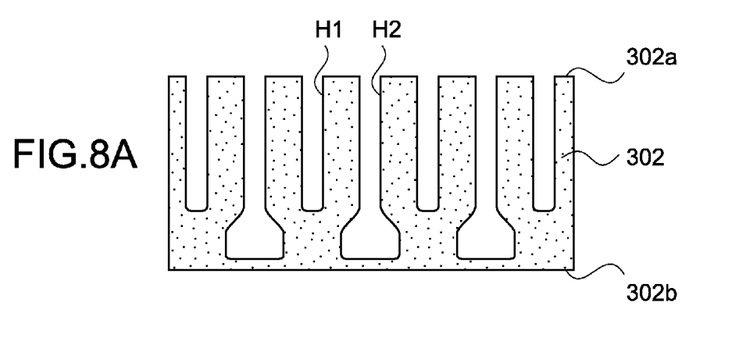
FIGS. 8A, 8B and 8C are each a schematic diagram showing a formation process of the capacitor.

Then, as shown in FIG. 8A, the substrate 301 not oxidized is removed. The removal of the substrate 301 can be done by wet etching, for example. Hereinafter, a surface of the substrate oxide 302 where the holes H1 and H2 are formed is defined as a front surface 302a, and the opposite side thereof is defined as a back surface 302b.

Figure 8B:
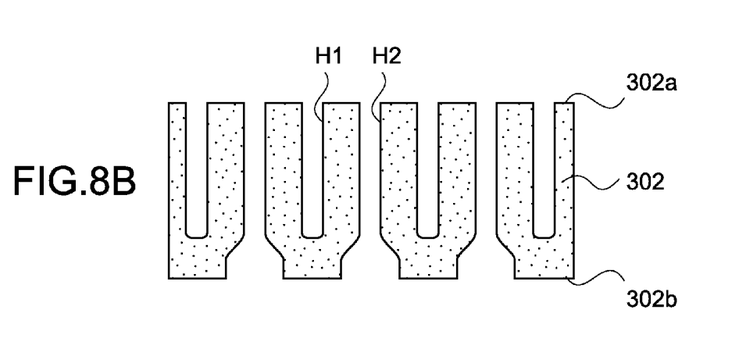

Next, as shown in FIG. 8B, the substrate oxide 302 is removed from the back surface 302b at a predetermined thickness. The removal can be made by a reactive ion etching (RIE). In this case, the substrate oxide 302 is removed to provide a thickness such that the holes H2 are communicated with the back surface 302b, but the holes H1 are not communicated with the back surface 302b.

Figure 8C:
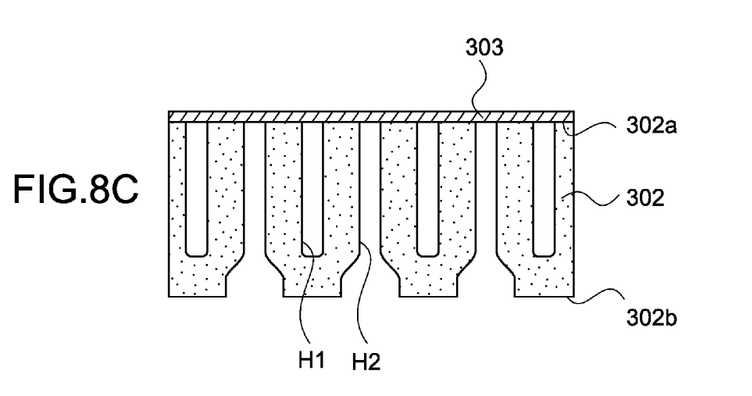

Then, as shown in FIG. 8C, a first conductor layer 303 including the conductive material is formed on the front surface 302a. The first conductor layer 303 can be formed by any method including a sputtering method, a vacuum vapor deposition method or the like.

Figure 9A:
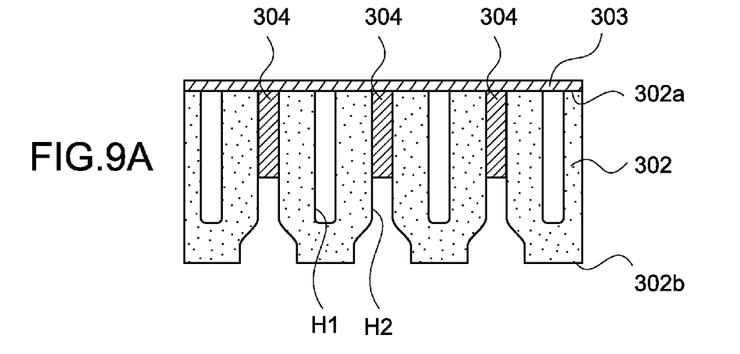
FIGS. 9A, 9B and 9C are each a schematic diagram showing a formation process of the capacitor.

Then, as shown in FIG. 9A, first internal conductor parts 304 including the conductive material are buried into the holes H2. The first internal conductor parts 304 can be buried by electrolytic plating the substrate oxide 302 using the first conductor layer 303 as a seed layer. Since no plating liquid enters into the holes H1, no first internal conductor parts 304 are formed in the holes H1.

Figure 9B:
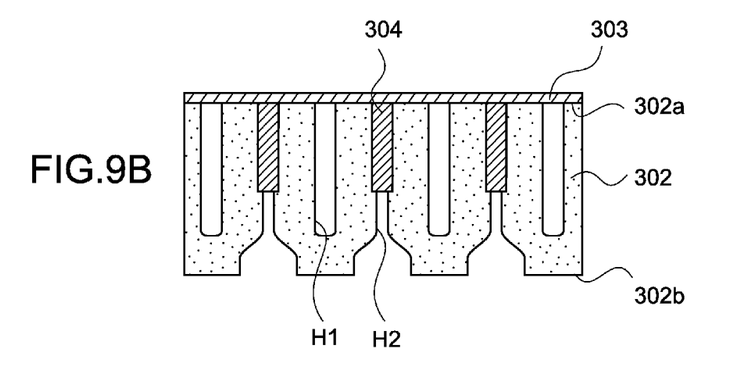

Then, as shown in FIG. 9B, the substrate oxide 302 is expanded. It is possible to expand the substrate oxide 302 by exposing the substrate oxide 302 to boiled water vapor for several seconds to several minutes. In this way, the hole diameter of the hole H2 is decreased from the hole diameter d3 to the hole diameter d4 (see FIG. 5). In the hole H2 where the first internal conductor part 304 is already buried, the hole diameter is not decreased and keeps the hole diameter d3 because the first internal conductor part 304 is provided.

Figure 9C:
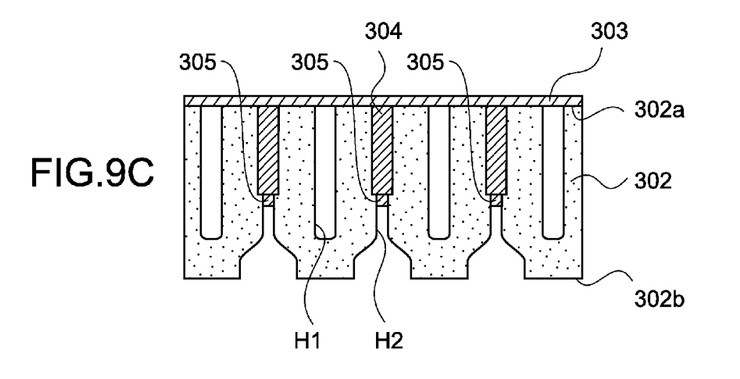

Then, as shown in FIG. 9C, second internal conductor parts 305 including the conductive material are buried into the holes H2. The second internal conductor parts 305 can be buried by electrolytic plating the substrate oxide 302 using the first conductor layer 303 as a seed layer. As described above, the holes H2 have decreased hole diameters, whereby the diameters of the second internal conductor parts 305 are smaller than those of the first internal conductor parts 304. The second internal conductor parts 305 are formed partway to the fourth diameter d4 in the second holes H2. Hereinafter, the first internal conductor part 304 is combined with the second internal conductor part 305 to be a first internal conductor 306.

Figure 10A:
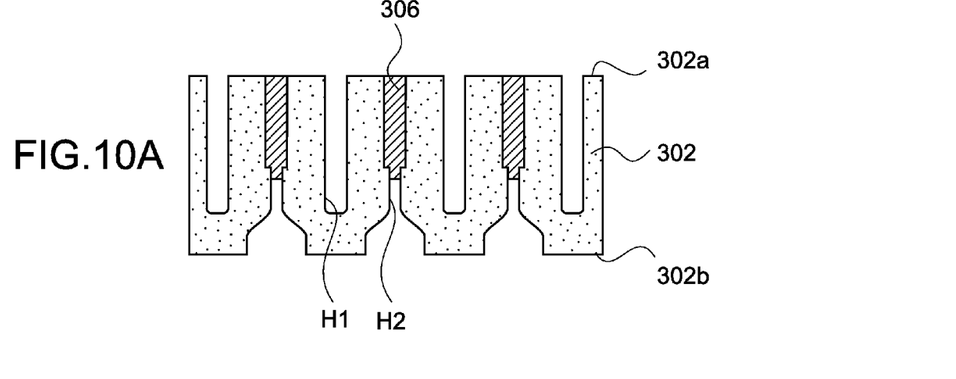
FIGS. 10A, 10B and 10C are each a schematic diagram showing a formation process of the capacitor.

Then, as shown in FIG. 10A, the first conductor layer 303 is removed. The removal of the first conductor layer 303 can be done by wet etching method, a dry etching method, an ion milling method, a Chemical Mechanical Polishing (CMP) method, or the like.

Figure 10B:
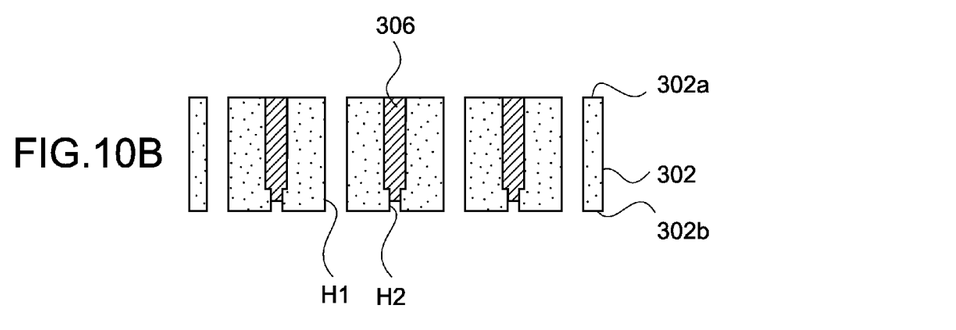

Then, as shown in FIG. 10B, the substrate oxide 302 is again removed from the back surface 302b at a predetermined thickness. The removal can be made by a reactive ion etching. In this case, the substrate oxide 302 is removed to provide a thickness such that the holes H1 are communicated with the back surface 302b, and the first internal conductors 306 are not communicated with the back surface 302b.

Here, voids where no first internal conductors 306 are formed in the holes H2 may be left as it is, or may be filled with the insulator. The insulator can be the insulating material such as the metal oxide similar to that used in the substrate oxide 302, an electrodepositable resin material (for example, polyimide, epoxy, acrylic etc.), SiO and the like. The thickness of the space can be set depending on a device capacity of the capacitor 100, the insulation breakdown withstand voltage and the like, and can be several tens nm to several tens μms, for example.

Figure 10C:
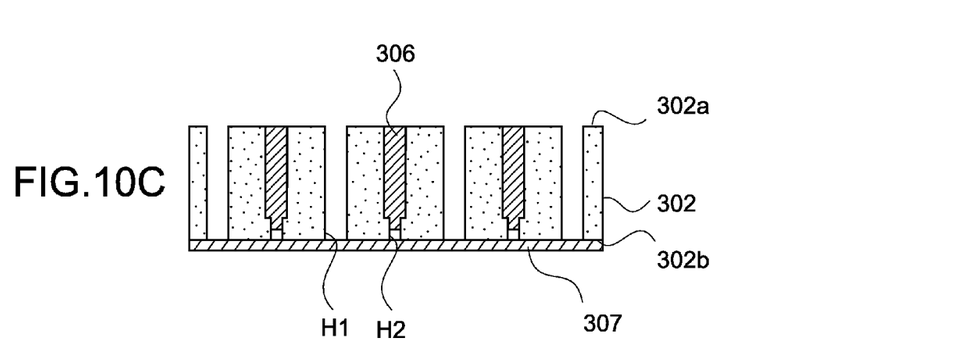

Then, as shown in FIG. 10C, a second conductor layer 307 including the conductive material is formed on the back surface 302b. The second conductor layer 307 can be formed by any method including a sputtering method, a vacuum vapor deposition method or the like.

Figure 11A:
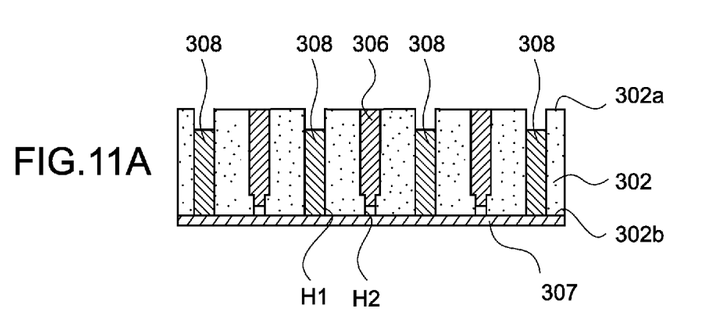
FIGS. 11A, 11B and 11C are each a schematic diagram showing a formation process of the capacitor.

Then, as shown in FIG. 11A, third internal conductor parts 308 including the conductive material are buried into the holes H1. The third internal conductor parts 308 can be buried by electrolytic plating the substrate oxide 302 using the second conductor layer 307 as a seed layer. The first internal conductors 306 are separated and insulated from the second conductor layer 307, and therefore are not electrolytic plated.

Figure 11B:
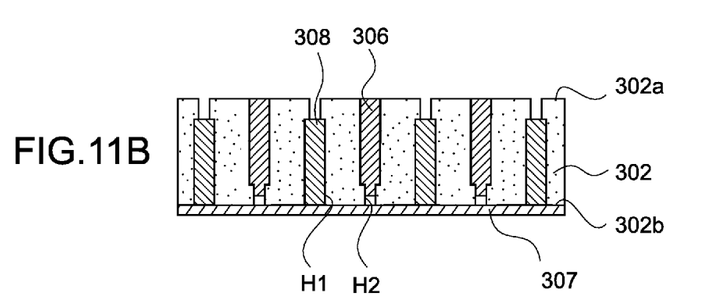

Then, as shown in FIG. 11B, the substrate oxide 302 is again expanded. It is possible to expand the substrate oxide 302 by exposing the substrate oxide 302 to boiled water vapor for several seconds to several minutes. In this way, the hole diameter of the hole H1 is decreased from the hole diameter d1 to the hole diameter d2 (see FIG. 5). In the hole H1 where the third internal conductor part 308 is already buried, the hole diameter is not decreased and keeps the hole diameter d1 because the third internal conductor part 308 is provided.

Figure 11C:
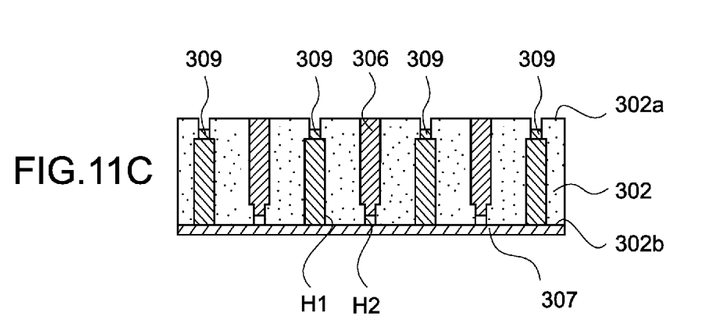

Then, as shown in FIG. 11C, fourth internal conductor parts 309 including the conductive material are buried into the holes H1. The fourth internal conductor parts 309 can be buried by electrolytic plating the substrate oxide 302 using the second conductor layer 307 as a seed layer. As described above, the holes H1 have decreased hole diameters, whereby the diameters of the fourth internal conductor parts 309 are smaller than those of the third internal conductor parts 308. The fourth internal conductor parts 309 are formed partway to the second diameters d2 in the holes H1. Hereinafter, the third internal conductor part 308 is combined with the fourth internal conductor part 309 to be a second internal conductor 310.

Here, voids where no second internal conductors 310 are formed in the holes H1 may be left as it is, or may be filled with the insulator. The insulator can be the insulating material such as the metal oxide similar to that used in the substrate oxide 302, an electrodepositable resin material (for example, polyimide, epoxy, acrylic etc.), SiO and the like. The thickness of the space can be set depending on a device capacity of the capacitor 100, the insulation breakdown withstand voltage and the like, and can be several tens nm to several tens μms, for example.

Figure 12:
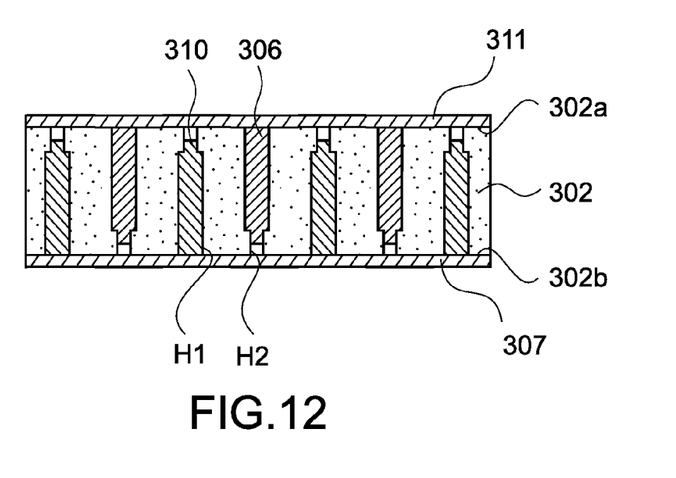
FIG. 12 is a sectional view of the capacitor according to an embodiment of the present disclosure.

Then, as shown in FIG. 12, a third conductor layer 311 including the conductive material is formed on the front surface 302a. The third conductor layer 311 can be formed by any method including a sputtering method, a vacuum vapor deposition method or the like such that the third conductor layer 311 is contacted to the first conductors 306.

As described above, the capacitor shown in FIG. 2 can be formed. The substrate oxide 302 corresponds to the dielectric layer 101, the second conductor layer 307 corresponds to the first external electrode layer 102, and the third conductor layer 311 corresponds to the second external electrode layer 103, respectively. Similarly, the first internal conductors 306 corresponds to the second internal electrodes 105, and the second internal conductors 310 corresponds to the first internal electrodes 104, respectively.

(Capacitor Alternative Embodiment)

Figure 13:
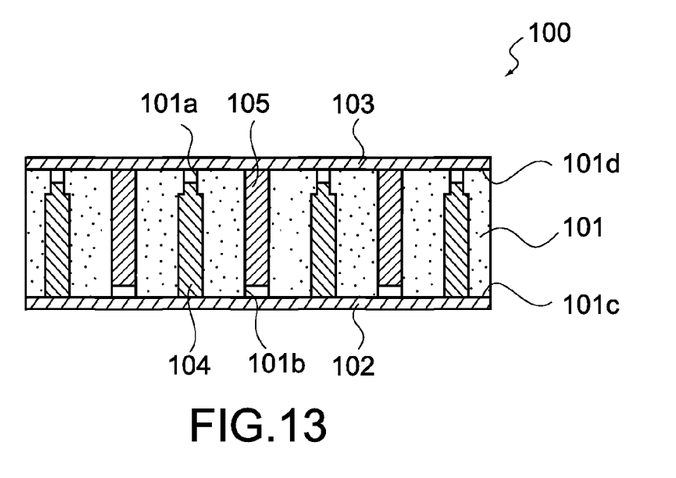
FIG. 13 is a sectional view of the capacitor according to an alternative embodiment of the present disclosure.

FIG. 13 is a schematic view showing an alternative embodiment of the capacitor 100 according to the embodiment. As shown in FIG. 13, in the dielectric layer 101 of the capacitor 100 according to the alternative embodiment, the first through-holes 101a may have a large hole diameter part and a small hole diameter part similar to the above-described embodiment. On the other hand, the second through-holes 101b are formed to have almost uniform hole diameter different from the above-described embodiment.

By such a configuration, the insulation properties between at least the first internal electrodes 104 and the second internal electrodes 105 can also be improved, while maintaining the capacity of the capacitor 100.

The capacitor 100 can be formed by the formation method similar to the above-described formation method. Specifically, the above-described formation method is performed except that the processes shown in FIGS. 11B and 11C are not performed and the substrate oxide 302 is expanded and the internal conductor is buried once instead of twice.

Figure 14:
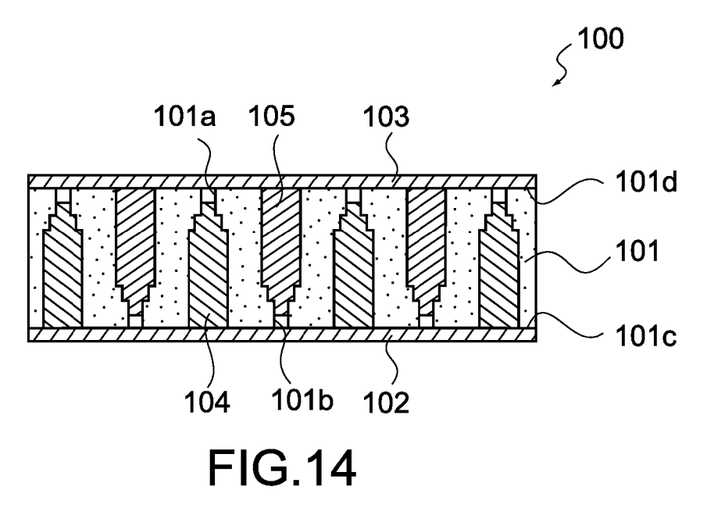
FIG. 14 is a sectional view of the capacitor according to another alternative embodiment of the present disclosure.
Figure 15:
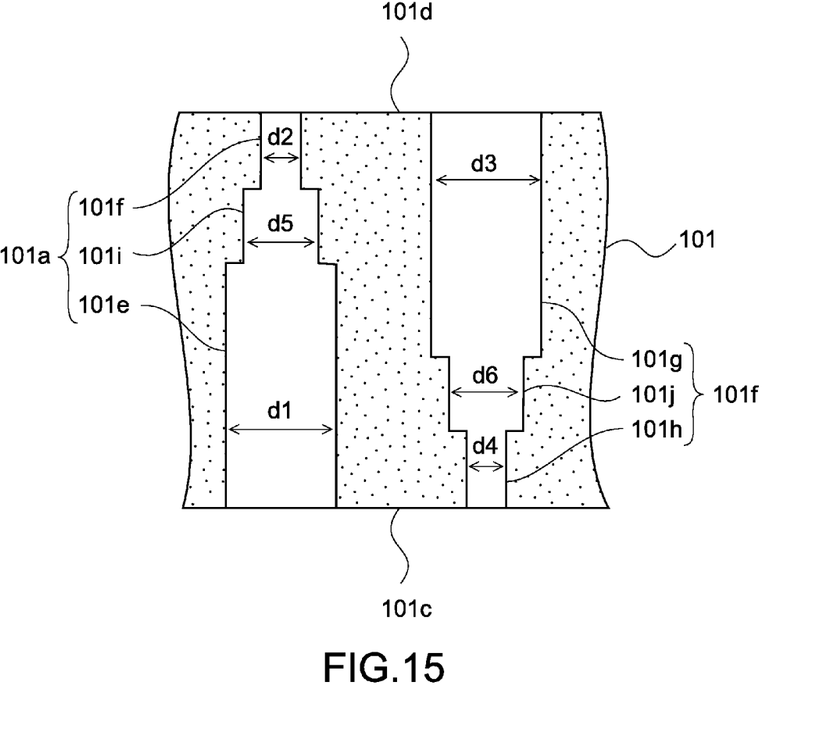
FIG. 15 is an enlarged sectional view showing the dielectric layer of the capacitor.

FIG. 14 is a schematic view of the capacitor 100 according to another alternative embodiment of the present disclosure. FIG. 15 is an enlarged view of the dielectric layer 101 in the capacitor 100. As shown in FIGS. 14 and 15, each of the first through-holes 101a has a fifth hole diameter part 101i in addition to the first hole diameter part 101e and the second hole diameter part 101f. The fifth hole diameter part 101i is formed between the first hole diameter part 101e and the second hole diameter part 101f. A hole diameter d5 of the fifth hole diameter part 101i may be smaller than the hole diameter d1 of the first hole diameter part 101e, and may be larger than the hole diameter d2 of the second hole diameter part 101f.

Each of the second through-holes 101b also has a sixth hole diameter part 101j in addition to the third hole diameter part 101g and the fourth hole diameter part 101h. The sixth hole diameter part 101j is formed between the third hole diameter part 101g and the fourth hole diameter part 101h. A hole diameter d6 of the sixth hole diameter part 101j may be smaller than the hole diameter d3 of the third hole diameter part 101g, and may be larger than the hole diameter d4 of the second hole diameter part 101h.

As shown in FIG. 14, the first internal electrodes 104 are formed depending on the shapes of the first through-holes 101a and are formed from the first external electrode layer 102 partway to the second hole diameter part 101f via the first hole diameter part 101e and the fifth hole diameter part 101j (see FIG. 15). Also, as shown in FIG. 14, the second internal electrodes 105 are formed depending on the shapes of the first through-holes 101b and are formed from the second external electrode layer 103 partway to the fourth hole diameter part 101h via the third hole diameter parts 101 and the sixth hole diameter part 101j (see FIG. 15).

According to the above-described embodiments, the second hole diameter part 101f and the fifth hole diameter part 101i are formed in the first through-holes 101a, whereby there are two leveled corners (differences in level in the hole diameter) and electric field concentration is dispersed. Therefore, the insulation breakdown started from the leveled corners of the first internal electrodes 104 can be prevented. In this way, the insulation properties between the first internal electrodes 104 and the second internal electrode 105 are further improved.

In the second through-holes 101b, the fourth hole diameter part 101h and the sixth hole diameter part 101j are formed, too. This allows the electric field concentration to be further dispersed at the leveled corners, whereby the insulation properties between the second internal electrodes 105 and the first internal electrodes 104 are further improved.

In other words, in the capacitor 100 according to the alternative embodiment, the insulation breakdown withstand voltage can be further improved while the capacity of the capacitor is maintained. The hole diameters of the first through-holes 101a and second through-holes 101b have three stages, but are not limited thereto, and may have multistage. Depending on a balance between the required capacity of the capacitor and the insulation breakdown withstand voltage, the numbers of the stages may be determined.

The capacitor 100 having such a configuration can be formed by the formation method similar to the above-described formation method. Specifically, expanding the substrate oxide 302 and burying the internal conductor may be repeated plural times for the intended stages of the hole diameter.

While the embodiments of the present disclosure are described, it should be appreciated that the present disclosure is not limited to the above-described embodiments, and variations and modifications may be made without departing from the spirit and scope of the present disclosure.

What is claimed is:

1. A capacitor, comprising:
   a dielectric layer having a first plane, a second plane opposite to the first plane, and a plurality of through-holes communicated with the first plane and the second plane; the plurality of through-holes including a first through-hole and a second through-hole, the first through-hole including a first hole diameter part having a first hole diameter and a second hole diameter part having a second hole diameter smaller than the first hole diameter at a second plane side;
   a first external conductor layer disposed on the first plane;
   a second external conductor layer disposed on the second plane;
   a first internal electrode formed in the first through-hole, connected to the first external electrode layer, disposed in the second hole diameter part at a tip and separated from the second external electrode layer; and
   a second internal electrode formed in the second through-hole, connected to the second external electrode layer, and separated from the first external electrode layer.

2. The capacitor according to claim 1, wherein
   the second through-hole includes a third hole diameter part having a third hole diameter and a fourth hole diameter part having a fourth diameter smaller than the third hole diameter at a first plane side, and
   the second internal electrode are disposed in the fourth hole diameter part at a tip.

3. The capacitor according to claim 2, wherein
   the first through-hole includes a fifth hole diameter part having a fifth hole diameter smaller than the first hole diameter and larger than the second hole diameter between the first hole diameter part and the second hole diameter part, and the second through-hole includes a sixth hole diameter part having a sixth hole diameter smaller than the third hole diameter and larger than the fourth hole diameter between the third hole diameter part and the fourth hole diameter part.

4. The capacitor according to claim 1, wherein
the dielectric layer is made of a material that provides the through-hole by anodic oxidation.

5. The capacitor according to claim 4, wherein
the dielectric layer is made of aluminum oxide.

* * * * *